T. KASANSZKY & S. BERNSTEIN.
CONSTRUCTION OF FURNITURE.
APPLICATION FILED JAN. 28, 1913.
1,136,811.
Patented Apr. 20, 1915.
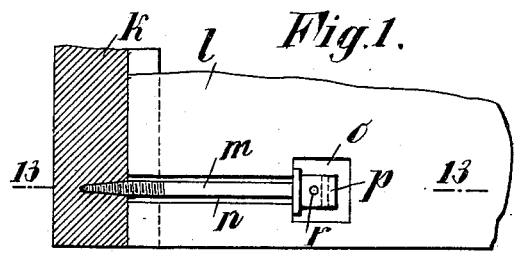
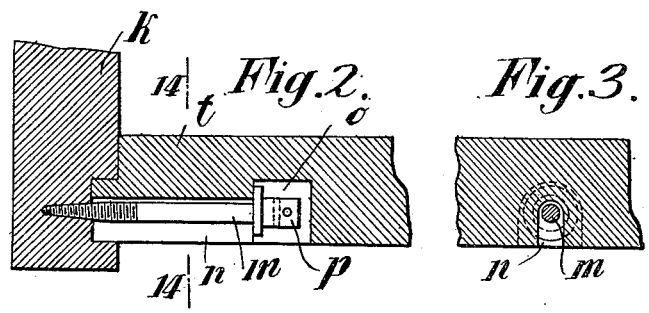

UNITED STATES PATENT OFFICE.

TIVADAR KASANSZKY, OF UJPEST, AND SÁNDOR BERNSTEIN, OF BUDAPEST, AUSTRIA-HUNGARY.

CONSTRUCTION OF FURNITURE.

1,136,811.      Specification of Letters Patent.      Patented Apr. 20, 1915.

Application filed January 28, 1913. Serial No. 744,655.

*To all whom it may concern:*

Be it known that we, TIVADAR KASANSZKY, a subject of the King of Hungary, and resident at Ujpest, Austria-Hungary, and SÁNDOR BERNSTEIN, a subject of the King of Hungary, and resident at Budapest, Austria-Hungary, have invented certain new and useful Improvements in the Construction of Furniture.

This invention relates to the construction of furniture or the like and has for its primary object the provision of a device adapted to detachably secure together various parts of the article of furniture.

A further object of this invention is to provide a joint fastening adapted to rigidly hold the parts in close relation.

A still further object of this invention is to provide a joint connection of the character set forth adapted to be removable in order that the article of furniture may be knocked down for shipping or other purposes.

With these and other objects in view this invention consists in the peculiar combination and arrangement of the various co-related parts of the improved furniture construction as hereinafter set forth and more particularly described in the appended claim.

Referring to the drawings wherein similar reference characters indicate similar parts wherever used:—Figure 1 is a view partially in elevation and partially in section of a joint construction in accordance with the present invention; Fig. 2 is a section on the line 13—13 of Fig. 1; and Fig. 3 is a section on the line 14—14 of Fig. 2.

The form of device shown in the drawings is more particularly adapted for making the non-visible or concealed joint of various parts of furniture wherein the head of the screw is not visible at the outside.

The reference letter $l$ designates a portion of a furniture construction and is provided with a longitudinal groove $n$, the side groove having its inner end recessed or enlarged as at $o$ for the reception of the enlarged head $p$ of the screw member $m$. The head of the screw is preferably made cylindrical and provided with diagonally extending members $r$ adapted for the insertion of any suitable instrument in order that the screw may be held tightened.

The operation of fastening the parts together is as follows: The members $k$ and $l$ are placed in their proper juxtaposition and the screw $m$ inserted in the groove $n$ in such a manner that the threaded end of the screw engages the portion $k$ whereupon by means of any suitable tool or instrument engaging the members $r$ the screw $m$ may be tightened against the edge of the enlargement $o$, thus drawing the portion $k$ into close proximity with the member $l$ making a tight joint, which however is easily removable should the furniture become broken.

We claim:

In a furniture joint, the combination with the members to be joined, one of said members having a seat forming a mortise, the other said member having a reduced tongue forming a tongue, the latter fitting in the seat, the member having the reduced tongue being provided with an open side groove which extends through the tongue, the inner end of the open side groove being enlarged to form an abutment adjacent the smaller portion of the open side groove, the enlarged inner end being also open to afford access through the outside, a screw having a flanged head, the latter having openings for the insertion of a tool to rotate the screw, the flange of the screw bearing against the abutment and the stem of said screw extending through the smaller portion of the open side groove and into the member formed with the seat whereby when the screw is rotated and driven into the member having the seat, the flange will impinge the abutment and force the tongue into the seat, the head of said screw being held in the enlarged end of the groove and accessible from the exterior and the point of the screw extending into the first member a distance greater than the length of the tongue, whereby by partially unscrewing the screw the tongue may be drawn out of the seat and the second member moved laterally for complete disengagement from the first member without disengagement of said screw from said first member.

In testimony whereof we have hereunto set our hands in presence of two witnesses.

TIVADAR KASANSZKY.
SÁNDOR BERNSTEIN.

Witnesses:
BARTOSENEV,
LATUICA SANDOR.

Copies of this patent may be obtained for five cents each, by addressing the "Commissioner of Patents, Washington, D. C."